US011989292B2

(12) United States Patent
Usui et al.

(10) Patent No.: US 11,989,292 B2
(45) Date of Patent: May 21, 2024

(54) ANALYSIS FUNCTION IMPARTING DEVICE, ANALYSIS FUNCTION IMPARTING METHOD, AND RECORDING MEDIUM

(71) Applicant: NIPPON TELEGRAPH AND TELEPHONE CORPORATION, Tokyo (JP)

(72) Inventors: Toshinori Usui, Musashino (JP); Yuto Otsuki, Musashino (JP); Makoto Iwamura, Musashino (JP); Yuhei Kawakoya, Musashino (JP); Jun Miyoshi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 484 days.

(21) Appl. No.: 17/283,546

(22) PCT Filed: May 21, 2019

(86) PCT No.: PCT/JP2019/020095
§ 371 (c)(1),
(2) Date: Apr. 8, 2021

(87) PCT Pub. No.: WO2020/075335
PCT Pub. Date: Apr. 16, 2020

(65) Prior Publication Data
US 2021/0390183 A1 Dec. 16, 2021

(30) Foreign Application Priority Data
Oct. 11, 2018 (JP) .................................. 2018-192966

(51) Int. Cl.
*G06F 21/56* (2013.01)
*G06F 9/54* (2006.01)
*G06F 21/54* (2013.01)

(52) U.S. Cl.
CPC .............. *G06F 21/563* (2013.01); *G06F 9/54* (2013.01); *G06F 21/54* (2013.01); *G06F 2221/032* (2013.01)

(58) Field of Classification Search
CPC .......... G06F 21/563; G06F 21/54; G06F 9/54; G06F 2221/032
See application file for complete search history.

(56) References Cited

U.S. PATENT DOCUMENTS 8,874,925 B1 * 10/2014 Resurreccion ........ G06F 21/556
713/180
2009/0288105 A1 * 11/2009 Wookey .................... G06F 9/54
719/328
(Continued)

FOREIGN PATENT DOCUMENTS

WO WO-2020075335 A1 * 4/2020 ............. G06F 21/54
WO WO-2023023135 A1 * 2/2023
WO WO-2023067668 A1 * 4/2023

OTHER PUBLICATIONS

Curtis Carmony et al., "Extract Me If You Can: Abusing PDF Parsers in Malware Detectors", 2016, total 15 pages.
(Continued)

*Primary Examiner* — Sarah Su
(74) *Attorney, Agent, or Firm* — XSENSUS LLP

(57) ABSTRACT

An analysis function imparting device according to the present invention includes processing circuitry configured to execute a script engine while monitoring the script engine to acquire an execution trace including an application programming interface (API) trace and a branch trace, analyze the execution trace, and detect a hook point that is a location to which a hook is applied and a code for analysis is inserted, detect, based on monitoring at the hook point, a tap point that is a memory monitoring location at which the code for analysis outputs a log, and apply a hook to the script engine
(Continued)

to impart an analysis function to the script engine based on the hook point and the tap point.

20 Claims, 16 Drawing Sheets

(56) References Cited

U.S. PATENT DOCUMENTS

| | | | | |
|---|---|---|---|---|
| 2011/0219447 | A1* | 9/2011 | Horovitz | G06F 21/566 726/22 |
| 2015/0332045 | A1* | 11/2015 | Akiyama | G06F 11/3466 726/23 |
| 2016/0359875 | A1* | 12/2016 | Kim | G06F 21/566 |
| 2019/0163905 | A1* | 5/2019 | Woodworth | G06F 21/554 |
| 2020/0012789 | A1* | 1/2020 | Usui | G06F 18/23 |
| 2023/0028595 | A1* | 1/2023 | Usui | G06F 9/455 |

OTHER PUBLICATIONS

Alef Farah et al., "Trace comparison using a sequence alignment algorithm", WSPPD 2015—XIII Workshop de Processamento Paralelo e Distribuido, 2015, pp. 17-20.

Shibata et al., "Js-Walker: An Analysis Framework for Analysts of Jamming JavaScript Code Using JavaScript API Hooking", Computer Security Symposium 2016, IPSJ, Oct. 11-13, 2016, pp. 951-957 (16 pages including English Translation).

Otsuki et al., "System Call Tracer based on Virtual Machine Monitor for Malware Analysis", Transactions of Information Processing Society of Japan, vol. 55, No. 9, Sep. 2014, pp. 2034-2046 (30 pages including English Translation).

Kawakoya et al., "API Chaser: Anti-Analysis Resistant Malware Analyzer", International Workshop on Recent Advances in Intrusion Detection, Springer, 2013, pp. 123-143.

Overveldt et al., "FlashDetect: ActionScript 3 Malware Detection", International Workshop on Recent Advances in Intrusion Detection, Springer, 2012, pp. 274-293.

Dolan-Gavitt et al., "Virtuoso: Narrowing the Semantic Gap in Virtual Machine Introspection", Proceedings of the IEEE Symposium on Security and Privacy (SP), 2011, pp. 297-312.

Dolan-Gavitt et al., "Tappan Zee (North) Bridge: Mining Memory Accesses for Introspection", Proceedings of the 2013 ACM SIGSAC conference on Computer & Communications Security, ACM, 2013, pp. 839-850.

Lee et al., "TIE: Principled Reverse Engineering of Types in Binary Programs", Network and Distributed System Security Symposium, Internet Society, 2011, pp. 1-18.

Kengo et al., "A Malicious Code Extraction Method for PDF Files Based on DBI", Computer Security Symposium 2017, IPSJ, Oct. 23-25, 2017, pp. 933-940 (18 pages including English Translation).

Odofu et al., "Comparison Method of Execution Traces Using 3-gram of Dynamic Dependent Graph", IPSJ SIG Software Engineering, vol. 2015-SE-187, No. 4, Mar. 5, 2015, pp. 1-8 ( 20 pages including English Translation).

Fujioka et al., "Suggestion of the Interactive Function Extraction Technique Based on the Property of the Object-Oriented Program", vol. 2016-SE-194 No. 2, Nov. 17, 2016, pp. 1-8 (20 pages including English Translation).

International Search Report and Written Opinion dated Aug. 20, 2019, received for PCT Application PCT/JP2019/020095, Filed on May 21, 2019, 10 pages including English Translation.

* cited by examiner

FIG.2-1

TEST SCRIPT

```
Dim objShell
Set objShell = CreateObject("WScript.Shell")
```

FIG.2-2

TEST SCRIPT (A FOR DIFFERENCE EXECUTION ANALYSIS)

```
Eval("1+1")
```

FIG.2-3

TEST SCRIPT (B FOR DIFFERENCE EXECUTION ANALYSIS)

```
Eval("1+1")
Eval("1+1")
Eval("1+1")
```

FIG.3

```
...
type: jmp from: 6d375f2e, to: 6d39022f
type: jmp from: 6d375f36, to: 6d39023b
type: jmp, from: 6d361c86, to: 6d39aee0
type: ret, from: 6d361c8c, to: 6d375f4c
type: ret, from: 6d375f4f, to: 6d375ee1
type: from: 6d375ee3, to: 6d38fb18
type: ret from: 6d38fb1c, to: 6d375cc9
type: jmp, from: 6d375ccb, to: 6d39500a
type: jmp, from: 6d375cd6, to: 6d39508a
type: call, from: 6d375ceb, to: 75e45435
type: API, name: CoGetClassObject, arg: 0, retaddr: 6d375cf1
type: API, name: CoGetClassObject, arg: 1, rclsid: 72c24dd5-d70a-438b-8a42-98424b88afb8
type: API, name: CoGetClassObject, arg: 2, riid: 00000001-0000-0000-c000-000000000046
...
```

FIG.4

| id | trace_id | image_name | branch_index | branch_type | src_addr | dst_addr | args |
|---|---|---|---|---|---|---|---|
| ⋮ | ⋮ | ⋮ | ⋮ | ⋮ | ⋮ | ⋮ | ⋮ |
| 1 | 1 | vbscript.dll | 8 | jmp | 0x51245 | 0x2150 | - |
| 1 | 1 | vbscript.dll | 9 | call | 0x21a0 | 0x51804 | - |
| 1 | 1 | vbscript.dll | 10 | API call: LoadLibrary | 0x5181a | 0x77f141d0 | test.dll |
| ⋮ | ⋮ | ⋮ | ⋮ | ⋮ | ⋮ | ⋮ | ⋮ |

FIG.5

| id | trace_id | hookpoint_addr |
|---|---|---|
| ... | ... | ... |
| 1 | 1 | 0x51804 |
| ... | ... | ... |

FIG.6

| id | trace_id | hookpoint_addr | tappoint_arg_number | variable_type |
|---|---|---|---|---|
| ... | ... | ... | ... | ... |
| 1 | 1 | 0x51804 | 2 | LPCSTR |
| 1 | 1 | 0x51804 | 3 | VARIANTARG |
| ... | ... | ... | ... | ... |

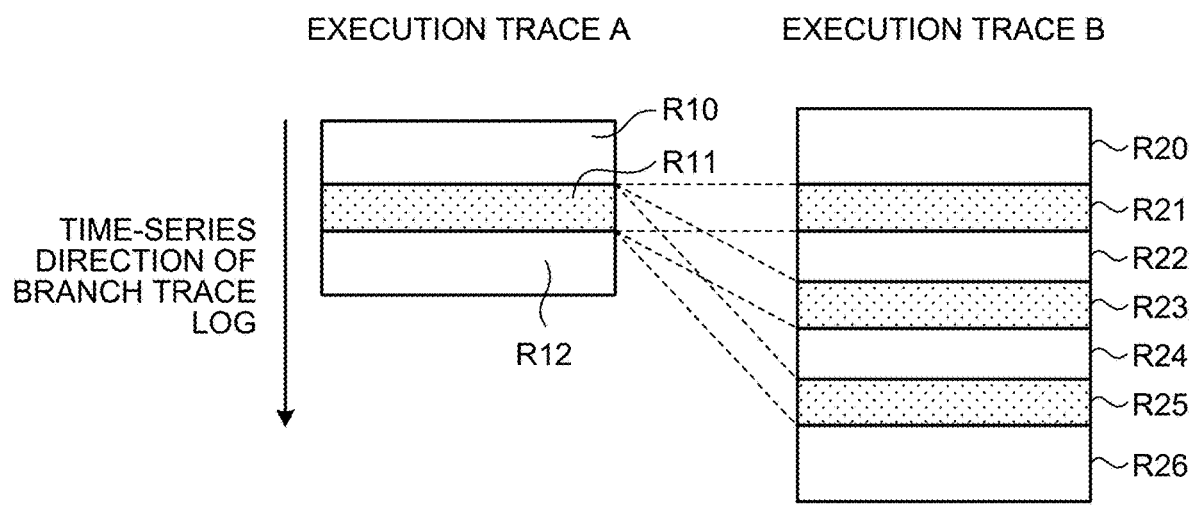

ANALYSIS FUNCTION IMPARTING DEVICE, ANALYSIS FUNCTION IMPARTING METHOD, AND RECORDING MEDIUM

CROSS-REFERENCE TO RELATED APPLICATIONS

The present application is based on PCT filing PCT/JP2019/020095, filed May 21, 2019, which claims priority to JP 2018-192966, filed Oct. 11, 2018, the entire contents of each are incorporated herein by reference.

TECHNICAL FIELD

The present invention relates to an analysis function imparting device, an analysis function imparting method, and an analysis function imparting program a recording medium.

BACKGROUND ART

With the emergence of various forms of attacks, such as malware-based spam (malspam) and file-less malware, the threat of attacks by scripts indicating malicious behavior (malicious scripts) has come to a head.

Malicious scripts are computer programs for implementing attacks by abusing functions provided by script engines. In general, attacks are executed by using the default script engine of the operating system (OS) or the script engine of a specific application, such as a web browser or a document file viewer.

Many of these script engines are also capable of achieving system-mediated behaviors such as file manipulation, network communication, and processing launch, although they may request user permission. Therefore, attacks using malicious scripts are just as much a threat to users as attacks using executable malware.

To take measures against attacks by malicious scripts, the behavior of scripts needs to be accurately grasped. Thus, technologies for analyzing scripts to clarify their behavior have been sought after.

One problem that arises when analyzing malicious scripts is code obfuscation. Many malicious scripts are subjected to processing for hindering analysis called "obfuscation". Obfuscation intentionally increases the complexity of codes to make it difficult to analyze codes based on superficial information on the codes. In other words, obfuscation hinders an analysis method called "static analysis", which analyzes information obtained from codes without executing any script.

Particularly when a part of the code to be executed is obtained dynamically from outside, the code cannot be analyzed statically because the code can only be obtained by execution. Thus, the static analysis is impossible because of its principle.

On the other hand, a method called "dynamic analysis" for executing a script and monitoring its action to know the behavior is not affected by the above-mentioned obfuscation. Thus, in the analysis of malicious scripts, methods based on dynamic analysis are mainly used.

Hooking is generally used in the dynamic analysis of malicious scripts. Hooking is a way for adding original processing to a particular location in a computer program. In order to monitor the code of a malicious script, a hook is used to add a process of outputting a log such that the execution status of the script can be understood and analyzed.

There are three main hook methods for analyzing scripts, depending on a location to which the hook is applied: script level hooking, system level hooking, and script engine level hooking.

Script level hooking is a method of applying a hook directly to the script to be analyzed. As described above, malicious scripts are generally obfuscated, so it is not easy to find a place in the script where a hook can be inserted that will provide useful information to the analyst. Therefore, a hook is implemented by overriding certain language elements. Here, a language element is a functional unit provided to programmers by a scripting language. Language elements include pre-defined functions, methods, and statements. For example, the eval function and document.write method provided by JavaScript (registered trademark), and the CreateObject statement provided by VBScript are each one language element.

System level hooking is a method of applying a hook to a system application programming interface (API) and a system call. The system level hooking applies a hook to a script and executes the script while monitoring the processing of the script engine to achieve analysis.

Script engine level hooking is a method of applying a hook to a specific function in the script engine. In general, it is not obvious which part of the program code in the script engine corresponds to the part to be hooked, so it is requested to identify the part to be hooked by analyzing the script engine. Then, in script engine level hooking, a hook is applied to the identified part, and the script is analyzed by executing the script.

These are all methods that have been put to practical use, and a plurality of analysis methods that apply these methods have been proposed. For example, Non Patent Document 1 describes a method of creating a framework for analyzing JavaScript by hooking it with JavaScript API hooking, which is a method of overriding the functions provided by JavaScript. This is an example of script level hooking. With this method, it is possible to analyze the behavior of scripts written in JavaScript.

In Non Patent Document 2, a system call is hooked, with hardware breakpoints, on a virtual machine monitor (VMM) and executed with reference to specific data structures in Windows, whereby a log of the system call trace at the thread level is obtained. According to this method, the behavior of the script can be analyzed over the script engine by obtaining the system call trace of the script engine that is executing the script. This is an example of system level hooking.

Non Patent Document 3 implements a function for analyzing data flow, called taint analysis, on a VMM to implement API hooking that precisely track the code to be analyzed. According to this method, by obtaining the API of the script engine that is executing the script, the behavior of the script can be analyzed over the script engine as well. This is another example of system level hooking.

Non Patent Document 4 illustrates a modification to an open source script engine (ActionScript in this document) to add the ability to trace method calls, access to properties, and class creation. This is an example of script engine level hooking. According to this technique, the behavior of a script can be analyzed.

CITATION LIST

Non Patent Document

Non Patent Document 1: R. Shibata, H. Hada, and K. Yokoyama, "Js-Walker: An Analysis Framework for Analysts of jamming JavaScript Code Using JavaScript API hooking," in Proc. of Computer Security Symposium 2016, IPSJ, pp. 951-957, 2016.

Non Patent Document 2: Y. Otsuki, E. Takimoto, S. Saito, K. Mouri, "A system call tracing method using virtual computer monitors for malware observation," Transactions of Information Processing Society of Japan, Vol. 55, No. 9, pp. 2034-2046, 2014.

Non Patent Document 3: Y. Kawakoya, M. Iwamura, E. Shioji, and T. Hariu, "API Chaser: Anti-analysis Resistant Malware Analyzer", International Workshop on Recent Advances in Intrusion Detection, Springer, pp. 123-143, 2013.

Non Patent Document 4: T. Van Overveldt, C. Kruegel, and G. Vigna, "FlashDetect: ActionScript 3 Malware Detection", International Workshop on Recent Advances in Intrusion Detection, Springer, pp. 274-293, 2012.

Non Patent Document 5: B. Dolan-Gavitt, T. Leek, M. Zhivich, J. Giffin, and W. Lee, "Virtuoso: Narrowing the Semantic Gap in Virtual Machine Introspection", Proceedings of the IEEE Symposium on Security and Privacy (SP) 2011, IEEE, pp. 297-312, 2011.

Non Patent Document 6: B. Dolan-Gavitt, T. Leek, J. Hodosh, and W. Lee, "Tappan Zee (North) Bridge: Mining Memory Accesses for Introspection", Proceedings of the 2013 ACM SIGSAC conference on Computer & Communications Security, ACM, pp. 839-850, 2013.

SUMMARY OF THE INVENTION

Technical Problem

However, the method using script level hooking described in the Non Patent Document 1 relies on language specifications that allow overriding of language elements such as built-in functions, and the methods can only be implemented for specific scripting languages with such language specifications, which results in a lack of versatility.

In addition, the method using system level hooking described in the Non Patent Documents 2 and 3 has the problem that there is a semantic gap between the script to be analyzed and the system calls and system APIs at the monitored locations.

A semantic gap refers to a semantic separation. The semantic gap is the change in the amount of information obtained when monitoring at the level of the script itself or its neighboring script engine, and the information obtained when monitoring at the level of the system that is separated from the script.

For example, the cookie operation observed in the language element Document.Cookie.Set at the script level is observed as a simple WriteFile to a file about cookies at the system level. This reduces the amount of semantic information from cookie operations to file operations. This is called loss of semantics, and it is an issue caused by the semantic gap.

The method of using script engine level hooking described in the Non Patent Document 4 does not create a semantic gap because the behavior can be monitored in the vicinity of the script engine, but it is not obvious how to implement the hook because it depends on the implementation of the script engine. This is a problem. In other words, the point in the script engine where the hook is applied and the code for analysis is inserted (referred to as hook point) and the memory monitoring point where the code for analysis is output as a log (referred to as tap point) are not known, and hence need to be clarified by analysis.

For open source script engines, this analysis can be done by analyzing the source code, but this is limited to scripting languages for which source code can be obtained and requests a certain amount of man-hours. For proprietary script engines, reverse engineering of binaries is requested, which is not practical because it requests skilled reverse engineers and a large amount of man-hours to perform manually. Furthermore, the automation of such reverse engineering has not been established.

On the other hand, unlike the problems faced by script level hooking and system level hooking, the problems of script engine level hooking can be solved in principle. In other words, if a hook point and a tap point can be detected from the binary of the script engine and a hook can be applied automatically, an analysis function can be imparted to any script engine without semantic gaps.

On the other hand, Non Patent Documents 5 and 6 propose an analysis method that extracts code parts with specific functions and detects a tap point by automatic reverse engineering for applications running on top of an OS on a VMM.

However, the methods described in the Non Patent Documents 5 and 6 do not achieve hook point detection, and because the target of application is not the script engine, there is a problem in that the methods have not yet achieved automatic hooking to the script engine.

The present invention has been made in view of the above, and it is an object thereof to provide an analysis function imparting device, an analysis function imparting method, and an analysis function imparting program that can be freely applied independently from the language specifications of scripting languages and that can implement the imparting of an analysis function without causing semantic gaps.

Means for Solving the Problem

To solve the above problem and attain the object, an analysis function imparting device according to the present invention includes: processing circuitry configured to: execute a script engine while monitoring the script engine to acquire an execution trace including an application programming interface (API) trace and a branch trace; analyze the execution trace, and detect a hook point that is a location to which a hook is applied and a code for analysis is inserted; detect, based on monitoring at the hook point, a tap point that is a memory monitoring location at which the code for analysis outputs a log; and apply a hook to the script engine to impart an analysis function to the script engine based on the hook point and the tap point.

Effects of Invention

According to the present invention, the imparting of an analysis function without causing semantic gaps that can be freely applied independently from language specifications of scripting languages can be implemented.

BRIEF DESCRIPTION OF DRAWINGS

FIG. 2-1 is a diagram illustrating an example of a test script illustrated in FIG. 1.

FIG. 2-2 is a diagram illustrating an example of the test script illustrated in FIG. 1.

FIG. 2-3 is a diagram illustrating an example of the test script illustrated in FIG. 1.

FIG. 3 is a diagram illustrating an example of an execution trace.

FIG. 4 is a diagram illustrating an example of a data configuration of data stored in an execution trace database (DB) illustrated in FIG. 1.

FIG. 5 is a diagram illustrating an example of a data configuration of data stored in a hook point DB.

FIG. 6 is a diagram illustrating an example of a data configuration of data stored in a tap point DB.

FIG. 8 is a diagram illustrating an example of processing in a difference execution analysis unit.

FIG. 9 is a diagram illustrating an example of processing by a modified Smith-Waterman algorithm.

DESCRIPTION OF EMBODIMENTS

Figure 1:
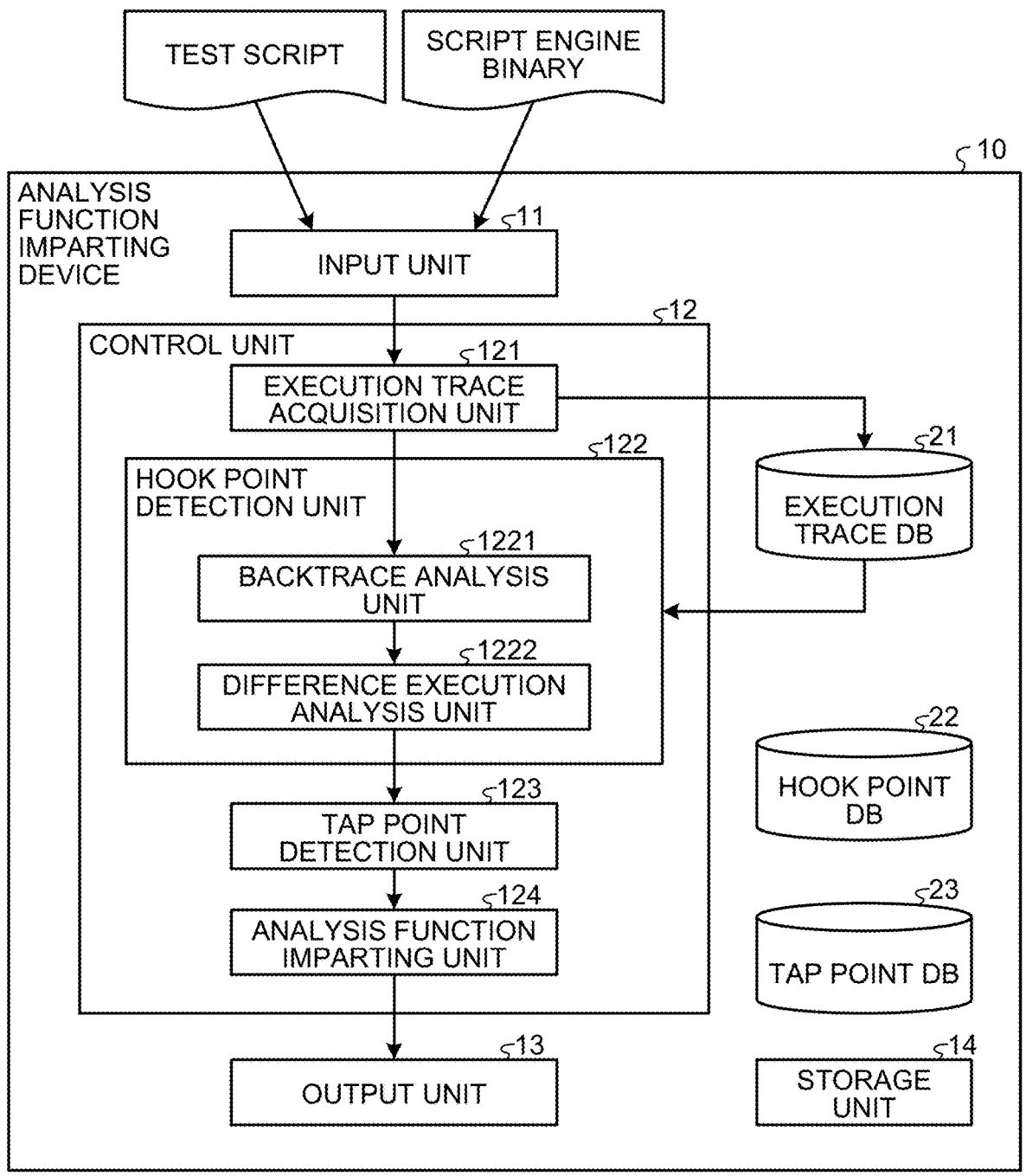
FIG. 1 is a schematic diagram exemplifying the outline of processing in an analysis function imparting device according to an embodiment.

Referring to the drawings, an embodiment of the present invention is described in detail below. Note that the present invention is not limited by the embodiment. In the figures, the same parts are denoted by the same reference symbols.

Embodiment

Regarding an analysis function imparting device according to the present embodiment, the schematic configuration of the analysis function imparting device and the flow and specific examples of processing in the analysis function imparting device are described. The analysis function imparting device according to the present embodiment detects a hook point and a tap point by using a test script to analyze a script engine binary.

The hook point is a location to which a hook is applied and a code for analysis is inserted. In the present embodiment, a function in internal implementation of a script engine (referred to as "internal function") is treated as a unit, and a hook is applied to the head of the internal function. The tap point is a memory monitoring location at which the code for analysis outputs a log, and is any of arguments of the internal function.

First, the analysis function imparting device acquires an execution trace including an API trace and a branch trace from a script engine binary by using a hook for a system API and a hook for a branch instruction. The API trace records an executed system API therein, and the branch trace records an executed branch therein.

The analysis function imparting device analyzes the execution trace to detect a hook point. Two analysis methods are applied to the detection of the hook point: backtrace analysis, which searches backward from the call of the system API, and differential execution analysis, which analyzes based on differences among a plurality of execution traces obtained by changing the conditions little by little. Hook points detected by these analysis methods are candidates of the hook point.

Furthermore, the analysis function imparting device applies a hook to the hook point candidates, and searches arguments of a hooked function to detect a tap point. Specifically, when an argument in a test script is found in arguments of a function of a hook point candidate, the analysis function imparting device determines that the hook point candidate is a valid hook point, and determines its argument as a tap point.

The analysis function imparting device applies a hook to the script engine binary based on the hook point and the tap point that have been obtained. By using the hook, the analysis function imparting device inserts into the hook point the language element corresponding to the hook point and the code to output a log of the memory at the tap point. With this hook, the analysis function imparting device logs out which language elements of the scripting language were executed with what arguments when the script was executed. In this way, the analysis function imparting device implements the imparting of an analysis function to the script engine as a retrofit.

Configuration of Analysis Function Imparting Device 10

First, the configuration of an analysis function imparting device 10 according to the embodiment is described with reference to FIG. 1. FIG. 1 is a diagram for describing an example of the configuration of the analysis function imparting device 10 according to the embodiment.

As illustrated in FIG. 1, the analysis function imparting device 10 includes an input unit 11, a control unit 12, an output unit 13, a storage unit 14, an execution trace DB 21, a hook point DB 22, and a tap point DB 23. The control unit 12 includes an execution trace acquisition unit 121 (acquisition unit), a hook point detection unit 122 (first detection unit), a tap point detection unit 123 (second detection unit), and an analysis function imparting unit 124 (imparting unit). The hook point detection unit 122 includes a backtrace analysis unit 1221 (second analysis unit) and a difference execution analysis unit 1222 (first analysis unit). The analysis function imparting device 10 receives input of a test script and a script engine binary.

The input unit 11 is configured by an input device, such as a keyboard and a mouse, and receives input of information from the outside and inputs the information to the control unit 12. The input unit 11 receives input of a test script and a script engine binary, and outputs the test script and the script engine binary to the control unit 12.

The test script is a script that is input when the script engine is dynamically analyzed to obtain the execution trace. The details of the test script are described later. The script engine binary is an executable file that constitutes the script engine. The script engine binary may be composed of a plurality of executable files.

The control unit 12 has an internal memory configured to store therein computer programs defining various kinds of processing procedures and requested data, and executes various kinds of processing by the computer programs and data. For example, the control unit 12 is an electronic circuit such as a central processing unit (CPU) and a micro processing unit (MPU). The control unit 12 includes an execution trace acquisition unit 121, a hook point detection unit 122, a tap point detection unit 123, and an analysis function imparting unit 124.

The execution trace acquisition unit 121 receives a test script and a script engine binary as input. The execution trace acquisition unit 121 executes the test script while monitoring the execution of the script engine binary, thereby acquiring an execution trace. The execution trace is configured by an API trace and a branch trace. The API trace records the invoked system API and its arguments at the time of execution. The branch trace records the type of branch instruction, the branch source address, and the branch destination address at the time of execution. It is known that the API trace can be obtained by a method called API hook, and the branch trace can be obtained by instruction hook. The execution trace acquisition unit 121 stores the acquired execution trace in the execution trace DB 21.

The hook point detection unit 122 includes a backtrace analysis unit 1221 and a difference execution analysis unit 1222. The hook point detection unit 122 extracts and analyzes an execution trace stored in the execution trace DB 21, and finds candidates of a hook point. The backtrace analysis unit 1221 and the difference execution analysis unit 1222 both serve to detect the candidates of the hook point. The hook point detection unit 122 inputs the execution trace to the backtrace analysis unit 1221.

The backtrace analysis unit 1221 searches for calls to the system API related to the analysis target for execution traces, and detects hook point candidates by backtracing. In other words, the backtrace analysis unit 1221 applies the backtrace from the system API corresponding to the language element to be analyzed to detect the hook point.

The difference execution analysis unit 1222 detects hook point candidates by extracting the differences among a plurality of execution traces with different acquisition conditions and finding the portions that satisfy specific conditions. The difference execution analysis unit 1222 detects hook points based on the differences found among a plurality of execution traces with the different conditions. In this manner, the difference execution analysis unit 1222 detects hook points using an algorithm that detects the occurrence of sequence with high homology a specific number of times. For example, the difference execution analysis unit 1222 uses a modified Smith-Waterman algorithm as an algorithm for detecting a specific number of occurrences of a sequence with high homology.

The tap point detection unit 123 detects a tap point by applying a hook to the hook point candidates obtained by the hook point detection unit 122 and searching the memory for the arguments of the hooked function. Based on the monitoring at the hook point, the tap point detection unit 123 detects the tap point, which is the memory monitoring point to be logged out by the code for analysis. In addition, the tap point detection unit 123 determines the hook point candidate with a tap point as a hook point.

The analysis function imparting unit 124 applies a hook to the hook point and the tap point that have been obtained, and imparts an analysis function to the script engine by outputting a log of the language element corresponding to the hook point and the argument appearing at the tap point. In other words, the analysis function imparting unit 124 imparts an analysis function by applying a hook to the script engine based on the hook point and tap point.

The output unit 13 is, for example, a liquid crystal display and a printer, and outputs various kinds of information including information on the provision of an analysis function. The output unit 13 may be an interface configured to input and output various kinds of data from and to an external device, and may output various kinds of information to the external device.

The storage unit 14 is implemented by a storage device such as a semiconductor memory element as represented by a random access memory (RAM) and a flash memory, a hard disk, or an optical disc, and stores therein processing programs for operating the analysis function imparting device 10 and data used in the execution of the processing programs.

The execution trace DB 21 stores therein execution traces acquired by the execution trace acquisition unit 121. The hook point DB 22 stores therein hook point candidates detected by the difference execution analysis unit 1222. The tap point DB 23 stores therein a tap point detected by the tap point detection unit 123.

Configuration of Test Script

First, a test script is described. FIG. 2-1 to FIG. 2-3 are diagrams illustrating examples of the test script.

A test script is a script that is input into the script engine for dynamic analysis. This test script serves to specify the language elements to be analyzed in the script engine. Therefore, in this form, a script that contains only the language elements to be analyzed is used. For example, if you want to analyze a process related to a language element called CreateObject to obtain the hook point and the tap point of this language element, create a test script that calls only CreateObject, as illustrated in FIG. 2-1. This test script is to be prepared in advance of the analysis and is to be created manually. This creation requests knowledge of the target scripting language specification.

In the test script for backtrace analysis, the arguments of the language elements, which can be arbitrarily set, are set to characteristic values. In this manner, it is determined to which system API the arguments passed in the script were finally passed by the script engine.

In differential execution analysis, a plurality of test scripts are used, such as the test script illustrated in FIG. 2-2 (A for differential execution analysis) and the test script illustrated in FIG. 2-3 (B for differential execution analysis). Then, in the differential execution analysis, hook points are detected by comparing the execution traces for each. The test scripts include scripts that call the language element to be analyzed only once, as in A for differential execution analysis, and scripts that call the language element a plurality of times, as in B for differential execution analysis. This allows the analysis function imparting device 10 to identify the part related to the language element by capturing the trace part that appears a plurality of times when the execution traces are compared.

Configuration of Execution Trace

Next, an execution trace is described. FIG. 3 is a diagram illustrating an example of the execution trace. As described above, the execution trace is configured by an API trace and a branch trace. FIG. 3 is a part of the execution trace. The configuration of the execution trace is described below with reference to FIG. 3.

The log line of the branch trace, for example, has the format illustrated in lines 1 through 10 of FIG. 3, and consists of three elements: "type," "from," and "to. The "type" indicates whether the branch instruction executed is a call instruction, a jmp instruction, or a ret instruction. The "from" element indicates the source address of the branch. The "to" field indicates the address of the branch destination.

An API trace log line, for example, has the format illustrated in lines 11 to 13 of FIG. 3, and consists of five elements: "type", "name", "argindex", "argname", and "arg". The "type" takes only the value "API" to indicate that it is a log line of API trace. The name of the API is stored in "name". The index of the argument of the API is stored in "argindex". The name of the argument is stored in "argname". The value of the observed argument is stored in "arg".

Configuration of Execution Trace DB

Next, the data configuration of data stored in the execution trace DB 21 is described. FIG. 4 is a diagram illustrating an example of the data configuration of data stored in the execution trace DB 21.

The execution trace DB 21 is a DB configured to store acquired execution traces therein. As illustrated in FIG. 4, the execution trace DB 21 has a table schema of "id", "trace_id", "image_name", "branch_index", "branch_type", "src_addr", "dst_addr", and "args".

"id" is an identifier allocated to be unique in the entire table, and has an integer value. "trace_id" is an identifier allocated to be unique for each acquired execution trace, and has an integer value. "image_name" is the name of the executable file of the script engine to be analyzed, from which the execution trace is obtained. "branch_index" is an ordinal number that indicates how many branches are recorded in one execution trace. "branch_type" indicates by which instruction the branch was made.

"branch_type" can be jmp, call, ret, and the like depending on the branch obtained from the execution trace. When the system API is called, "branch_type" also stores the type of the called system API. "src_addr" holds the branch source. "dst_addr" holds the address of the branch destination. In the case of a branch in "image_name", the offset may be stored. "Args" records the arguments when the system API is called.

Configuration of Hook Point DB

Next, the data configuration of data stored in the hook point DB 22 is described. FIG. 5 is a diagram illustrating an example of the data configuration of data stored in the hook point DB 22.

The hook point DB 22 is a DB configured to store detected hook point candidates therein. As illustrated in FIG. 5, the hook point DB 22 has a table schema of "id", "trace_id", and "hookpoint_addr".

"id" and "trace_id" are similar to those in the execution trace DB 21. "hookpoint_addr" holds an address of a hook point candidate. As described above, the hook point is the head address of the function.

Configuration of Tap Point DB

Next, the data configuration of data stored in the tap point DB 23 is described. FIG. 6 is a diagram illustrating an example of the data configuration of data stored in the tap point DB 23.

The tap point DB 23 is a DB configured to store detected tap point candidates therein. As illustrated in FIG. 6, the tap point DB 23 has a table schema of "id", "trace_id", "hookpoint_addr", "tappoint_arg_number", and "variable_type".

"id", "trace_id", and "hookpoint_addr" are similar to those in the execution trace DB 21. "tappoint_arg_number" indicates how many arguments of the function pointed to by the hookpoint is the tap point. "variable_type" is the type of the variable.

Processing in Backtrace Analysis Unit

Figure 7:
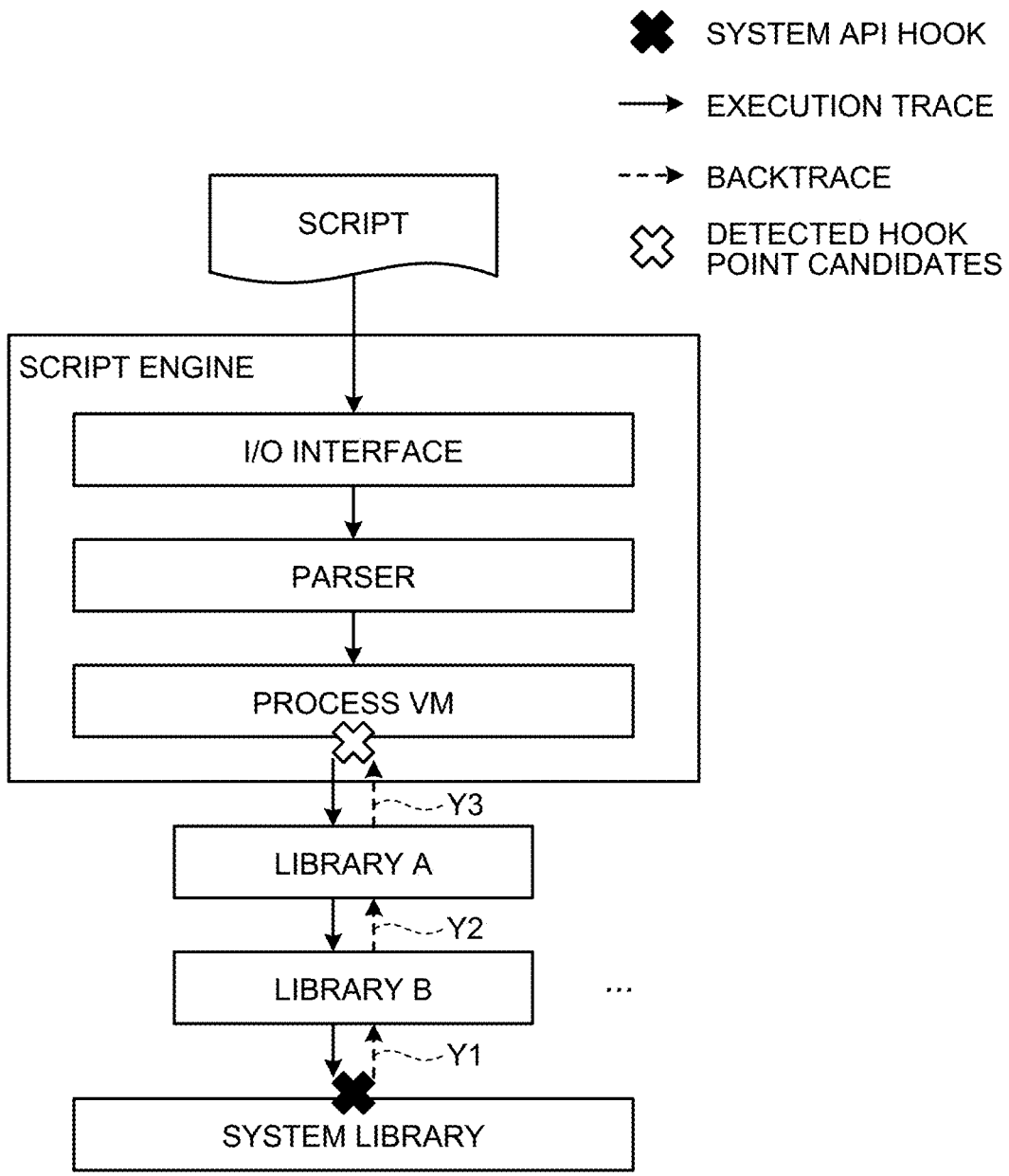
FIG. 7 is a diagram illustrating an example of processing in a backtrace analysis unit.

Next, processing in the backtrace analysis unit 1221 is described with reference to FIG. 7. FIG. 7 is a diagram for describing an example of processing in the backtrace analysis unit 1221.

The backtrace based detection method is implemented by analyzing the logs of the execution traces that are obtained. This backtrace-based detection method is used to detect hook points of language elements that request interaction with the system. In other words, it is effective for language elements that involve calls to the system API.

This method is based on the assumption that a language element that needs to interact with the system will call the requested system API from the code area related to that language element in the script engine. Therefore, in this detection method, the code part related to the language element is identified by following the arrows Y1 to Y3 from the system API call marked with a black X in FIG. 5 to the code area of the script engine marked with white x, and the hook point related to the language element that exists there is detected.

For this purpose, first, the backtrace analysis unit 1221 finds the calls in which the arguments of the language elements being executed in the script appear as arguments of the system API. Then, the backtrace analysis unit 1221 traces back from there to the caller based on the branch trace. When the backtrace analysis unit 1221 reaches the script engine, it detects N branches from the call point in the script engine as hook point candidates. The reason why the backtrace is traced N times from the script engine is because it takes into account the case where the system API is called via stubs, etc., instead of using the point where the backtrace reaches the script engine as the hook point. For example, N=10 is used for this N.

Processing in Difference Execution Analysis Unit

Next, processing in the difference execution analysis unit 1222 that uses another hook point detection method is described. Differential execution analysis is a method of dynamic analysis by acquiring a plurality of execution traces while changing the conditions and by analyzing the differences among the execution traces. This detection method is effective for language elements that do not involve calls to the system API.

For example, the Eval function of VBScript is a closed language element in the script engine, and there is no need to call the system API. However, manual analysis has an interest because manual analysis has useful information for the analyst. For such language elements, the detection method by backtracing that depends on the system API is not effective, but the method by this differential execution analysis can perform detection. The method is based on the assumption that only the execution trace of the code related to the language element will appear as a difference between the execution trace when only the element is called once and the execution trace when analysis is executed a plurality of times.

The difference execution analysis unit 1222 receives a plurality of test scripts and their execution traces as input. The test scripts include scripts that call the language element to be analyzed only once (e.g., A for differential execution analysis in FIG. 2-2) and scripts that call it a plurality of times (e.g., B for differential execution analysis in FIG. 2-3). Then, the difference execution analysis unit 1222 detects the differences by comparing the execution traces to one another. In this way, the difference execution analysis unit 1222 captures the part of the trace related to the language element to be analyzed that appears in the difference when the execution traces are compared.

FIG. 8 is a diagram illustrating an example of processing in the difference execution analysis unit 1222. In FIG. 8, an execution trace (referred to as execution trace A) for the test script (A for difference execution analysis) in FIG. 2-2 and an execution trace (referred to as execution trace B) for the test script (B for difference execution analysis) in FIG. 2-3 are compared.

In the test script (A for differential execution analysis), the Eval function, which is the language element to be analyzed, is called only once, and in the test script (B for differential execution analysis), the Eval function is called a plurality of times (three times). Therefore, when the execution trace A is compared with the execution trace B, it is understood that in the branch trace portion, a subset of branch traces that appear only once in execution trace A and three times in execution trace B, such as portions R11, R21, R23, and R25 in FIG. 8. This part is the set of branches corresponding to the Eval function of the language element to be analyzed, and is a candidate hook point.

This extraction can be achieved by the Smith-Waterman algorithm, which is a local alignment detection method that extracts subseries with high homology from two or more series. However, since the Smith-Waterman algorithm does not take into account the constraint on the number of occurrences, such as one occurring once in one and three in the other, as mentioned earlier, the following modifications were made.

Processing by Modified Smith-Waterman Algorithm

Next, processing by a modified Smith-Waterman algorithm is described with reference to FIG. 9. FIG. 9 is a diagram illustrating an example of the processing by a modified Smith-Waterman algorithm.

The Smith-Waterman algorithm is a sequence alignment algorithm based on dynamic programming (DP), which can extract subsequence with high homology from two or more sequences.

In this algorithm, a table called "DP table" illustrated in FIG. 9 is used. In the DP table, one sequence is placed at the head of the table and the other sequence at the side, and the match score is entered in each cell. With the subscript in the x-axis direction being i and the subscript in the y-axis direction being j, the score F(i,j) in the cell (i,j) is calculated based on Expression (1). Up to the creation of this DP table, it is the same as the ordinary Smith-Waterman algorithm. The s(i,j) and d in Expression (1) are indicated as Expressions (2) and (3).

$$F(i, j) = \max \begin{cases} 0 \\ F(i-1, j-1) + s(i, j) \\ F(i-1, j) + d \\ F(i, j-1) + d \end{cases} \quad (1)$$

$$S(i, j) = \begin{cases} 2 & \text{(math)} \\ -2 & \text{(unmatch)} \end{cases} \quad (2)$$

$$d = -1 \quad (3)$$

A, B, and C in FIG. 9 are combined to form one part each of R11, R21, R23, and R25 in FIG. 8. S is the part R10 and R20 that appears at the beginning of the execution trace in FIG. 8. E is the part R12 and R26 that appears at the end of FIG. 8. M is the part R22 and R24 that appears between parts R21, R23, and R25. Originally, each of these elements consists of a log of a plurality of branching traces, but for simplicity, the alphabet is used and compressed.

By backtracking from the cell with the largest score (cell C1 in FIG. 7), the subsequence with the highest homology (dashed lines W1 and SABC including cell C1 in FIG. 7) is found and the processing is finished, but in the modified method, further search is performed from here.

The difference execution analysis unit 1222 extracts the subsequences with high homology again for the same row (part W11 in FIG. 7) in the DP table excluding the subsequences extracted by the algorithm. The difference execution analysis unit 1222 repeats this process for the number of times the test script is invoked, and if the similarity of each substring among the extracted substrings (substrings W1, W2, and W3 in FIG. 7) is greater than or equal to a threshold value, the branch trace log that constitutes the substring is detected as a hook point candidate is detected as a hook point candidate. On the other hand, if the similarity of each substring is less than the threshold, the difference execution analysis unit 1222 examines the next cell with the highest score.

Processing in Tap Point Detection Unit

Figure 10:
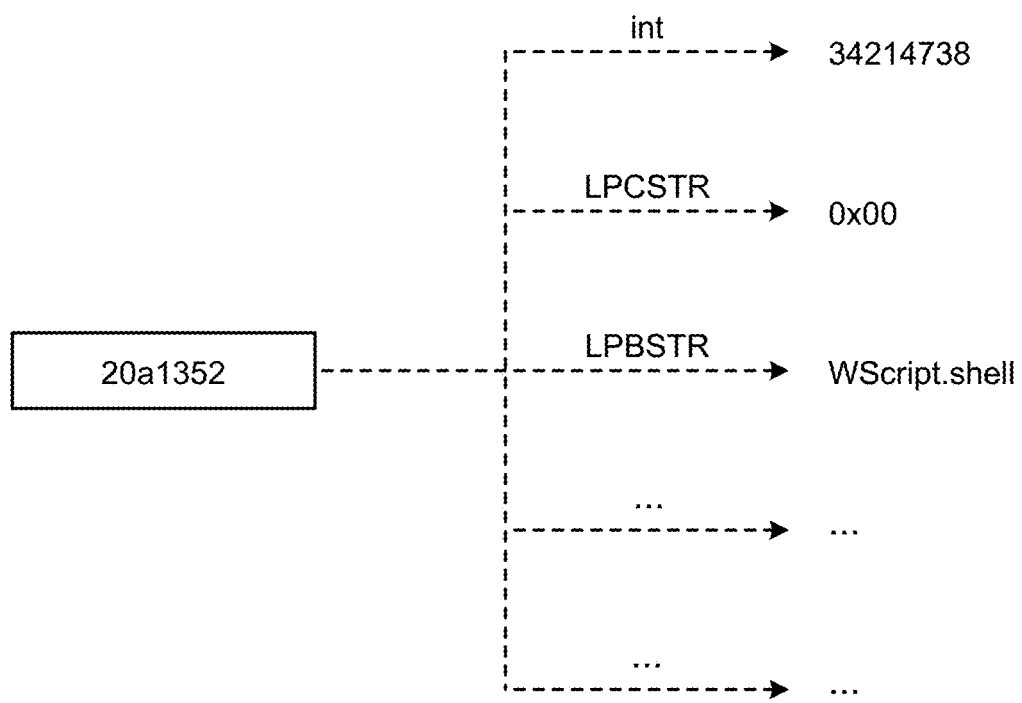
FIG. 10 is a diagram illustrating an example of processing in a tap point detection unit.

Next, processing in the tap point detection unit 123 is described with reference to FIG. 10. FIG. 10 is a diagram illustrating an example of processing in the tap point detection unit 123.

Tap point detection plays the following two roles: first, to determine the final hook point from among the hook point candidates obtained by hook point detection, and second, to identify the memory location to be logged out when hooking. The tap point is detected by searching for the argument of the function that is the hook point.

For this purpose, the tap point detection unit 123 applies a hook to the hook point candidates that has been obtained so far and obtains the execution trace again. The arguments can be obtained by referring to them according to the calling convention. Because the type information of each argument is not available at this time, heuristics are requested for further search.

For this heuristics, a search as illustrated in FIG. 10 is used. First, if the argument cannot be referred to as a pointer, it is assumed to be a value. If the argument can be referred to as a pointer, it is referred to as a pointer. Both cases of referring to it as a value and as a pointer are considered as various types.

For example, in FIG. 10, it is referred to as the LPCSTR and LPBSTR types as well as the int type value. As a result, if the argument used in the test script is observed in the hook point candidate, the tap point detection unit 123 determines the hook point and the point where the argument is obtained is considered as the tap point. In the case of FIG. 8, if there is an argument named WScript.Shell in the test script, the tap point detection unit 123 detects this argument as a tap point because this argument is observed when it is considered as an LPBSTR type.

Of course, the process of the tap point detection unit 123 is not limited to the above, and other search methods may be used. For example, a method to obtain type information by reverse engineering without using heuristics (for details, see, for example, J. Lee, T. Avgerinos, and D. Brumley, "TIE: Principled Reverse Engineering of Types in Binary Programs", Network and Distributed System Security Symposium, Internet Society, 2011) may be used.

Processing in Analysis Function Imparting Unit

Next, processing in the analysis function imparting unit 124 is described. The analysis function imparting unit 124 receives a script engine binary and the hook point and the tap point detected through the above-mentioned processing as input. The analysis function imparting unit 124 applies a hook to the hook point in the script engine. As a function to be implemented at the time of hooking, the analysis code is inserted so that the execution of the language element corresponding to the hook and the memory at the tap point as its argument are output as a log. This analysis code can be easily generated if the hook point and tap point are known. In this manner, the behavior of the script is logged out when executed, thus imparting an analysis function.

The imparting of the analysis function by hooking may be implemented by directly rewriting the binary for the script engine binary, or by rewriting the memory image when the binary is executed and expanded on the process memory.

Processing Procedure in Analysis Function Imparting Device

Figure 11:
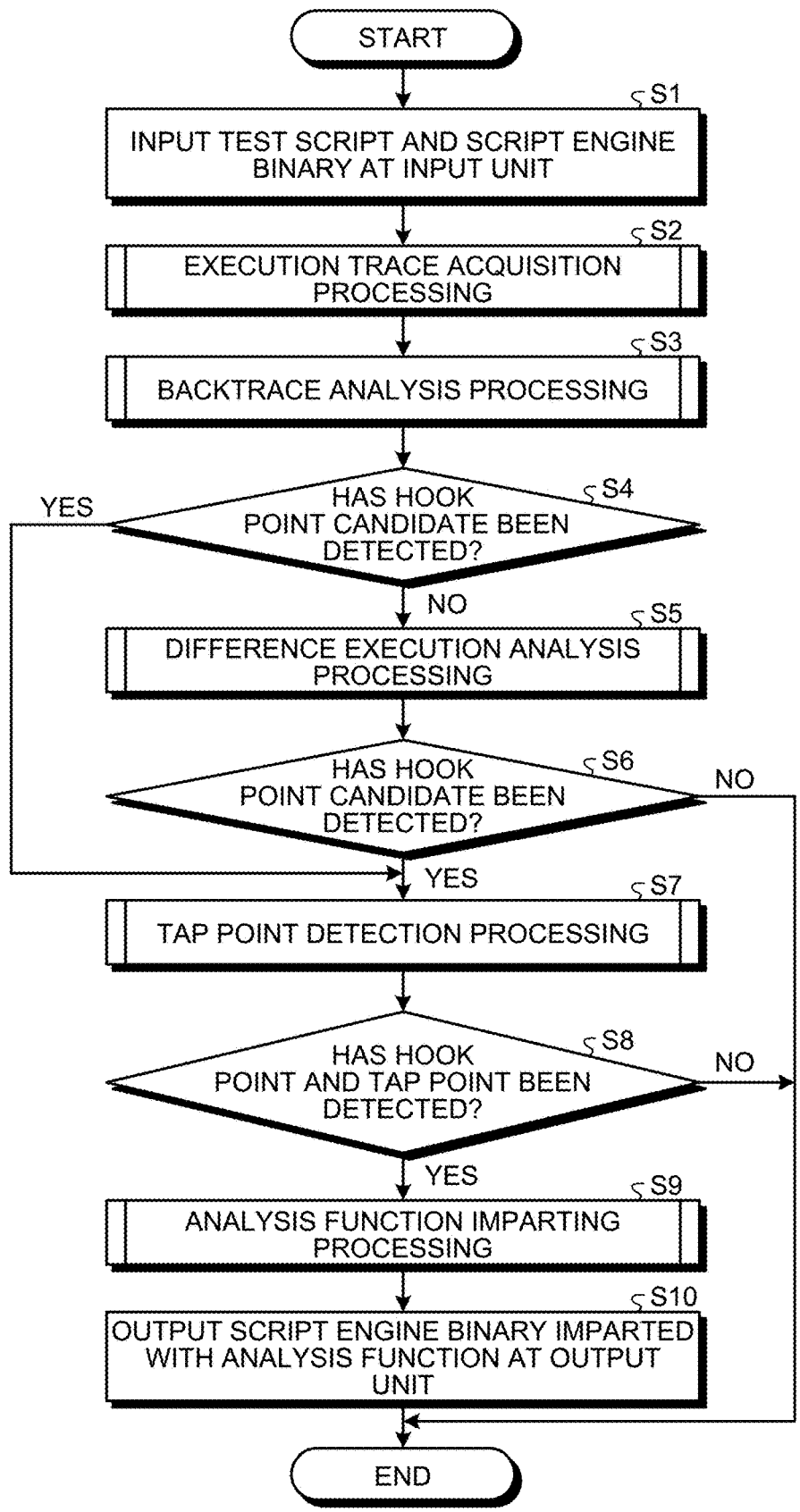
FIG. 11 is a flowchart illustrating a processing procedure of an analysis function imparting method according to the embodiment.

FIG. 11 is a flowchart illustrating a processing procedure of an analysis function imparting method according to the embodiment.

First, as illustrated in FIG. 11, the input unit 11 receives a test script and a script engine binary as input (Step S1). Next, the execution trace acquisition unit 121 performs execution trace acquisition processing (Step S2). The backtrace analysis unit 1221 detects hook point candidates by backtrace analysis processing (Step S3). In this case, when a hook point candidate has been detected (Yes at Step S4), the analysis function imparting device 10 proceeds to Step S7. On the other hand, when a hook point candidate has not been detected (No at Step S4), the difference execution analysis unit 1222 performs difference execution analysis processing (Step S5).

When a hook point candidate has not been detected (No at Step S6), the analysis function imparting device 10 finishes the processing because there is no detection of hook point candidates. On the other hand, when a hook point candidate has been detected (Yes at Step S6), the analysis function imparting device 10 proceeds to Step S7.

The tap point detection unit 123 performs tap point detection processing (Step S7). When a hook point and a tap point have not been detected (No at Step S8), the analysis function imparting device 10 finishes the processing.

On the other hand, when a hook point and a tap point have been detected (Yes at Step S8), the analysis function imparting unit 124 performs analysis function imparting processing (Step S9). The analysis function imparting device 10 outputs the script engine binary imparted with the analysis function on the output unit 13 (Step S10), and finishes the processing.

Processing Procedure of Execution Trace Acquisition Processing

Figure 12:
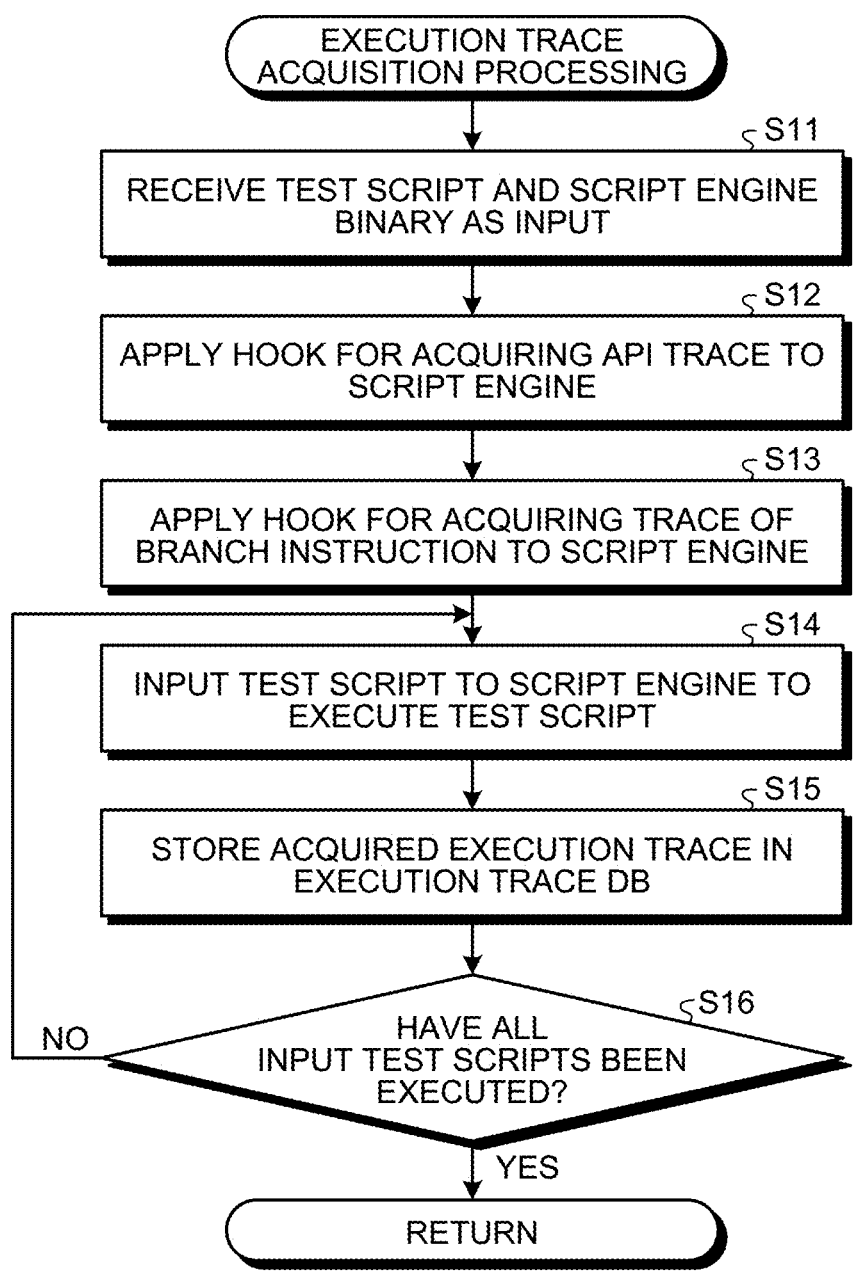
FIG. 12 is a flowchart illustrating a processing procedure of execution trace acquisition processing illustrated in FIG. 11.

Next, the execution trace acquisition processing (Step S2) illustrated in FIG. 11 is described. FIG. 12 is a flowchart illustrating a processing procedure of the execution trace acquisition processing illustrated in FIG. 11.

First, the execution trace acquisition unit 121 receives a test script and a script engine binary as input (Step S11). Then, the execution trace acquisition unit 121 applies a hook to the received script engine to obtain the API trace (Step S12). The execution trace acquisition unit 121 also applies a hook to obtain the trace of the branch instruction (Step S13). Then, the execution trace acquisition unit 121 inputs the test script received in that state to the script engine to execute the test script (Step S14), and stores the acquired execution trace in the execution trace DB 21 (Step S15).

When the execution trace acquisition unit 121 has finished executing all the inputted test scripts (Yes at Step S16), the process is finished. On the other hand, when the execution trace acquisition unit 121 has not completely executed all of the input test scripts (No at Step S16), the flow returns to the execution of the test scripts (Step S14) and continues the processing.

Processing Procedure of Backtrace Analysis Processing

Figure 13:
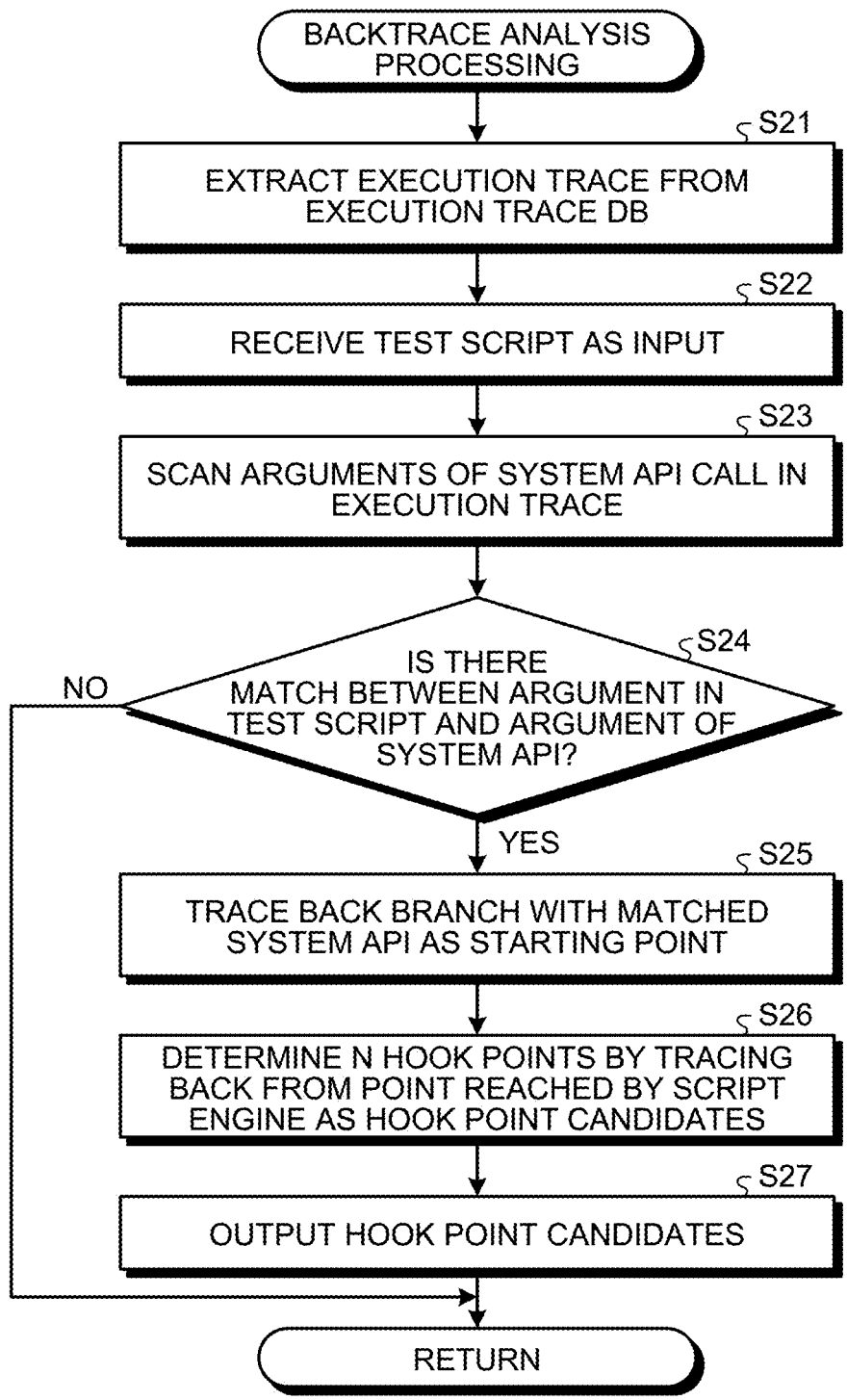
FIG. 13 is a flowchart illustrating a processing procedure of backtrace analysis processing illustrated in FIG. 11.

Next, the flow of backtrace analysis processing (Step S3) illustrated in FIG. 11 is described. FIG. 13 is a flowchart illustrating a processing procedure of the backtrace analysis processing illustrated in FIG. 11.

First, the backtrace analysis unit 1221 extracts an execution trace from the execution trace DB 21 (Step S21). The backtrace analysis unit 1221 receives a test script as input (Step S22). The backtrace analysis unit 1221 scans the arguments during the call of the system API existing in the execution trace (Step S23).

In this case, if there is no match between the arguments in the test script and the arguments in the system API (No at Step S24), the backtrace analysis unit 1221 finishes the processing, assuming that there are no hook points that can be detected by backtrace analysis.

On the other hand, when there is a match between the arguments in the test script and the arguments of the system API (Yes at Step S24), the backtrace analysis unit 1221 traces the branches in the execution trace backward, starting from the matched system API (Step S25). Then, the backtrace analysis unit 1221 sets the N branches obtained by tracing back N times from the point where the tracing reaches the script engine as hook point candidates (Step S26). Then, the backtrace analysis unit 1221 outputs these hook point candidates and ends the processing (Step S27).

Processing Procedure of Difference Execution Analysis Processing

Figure 14:
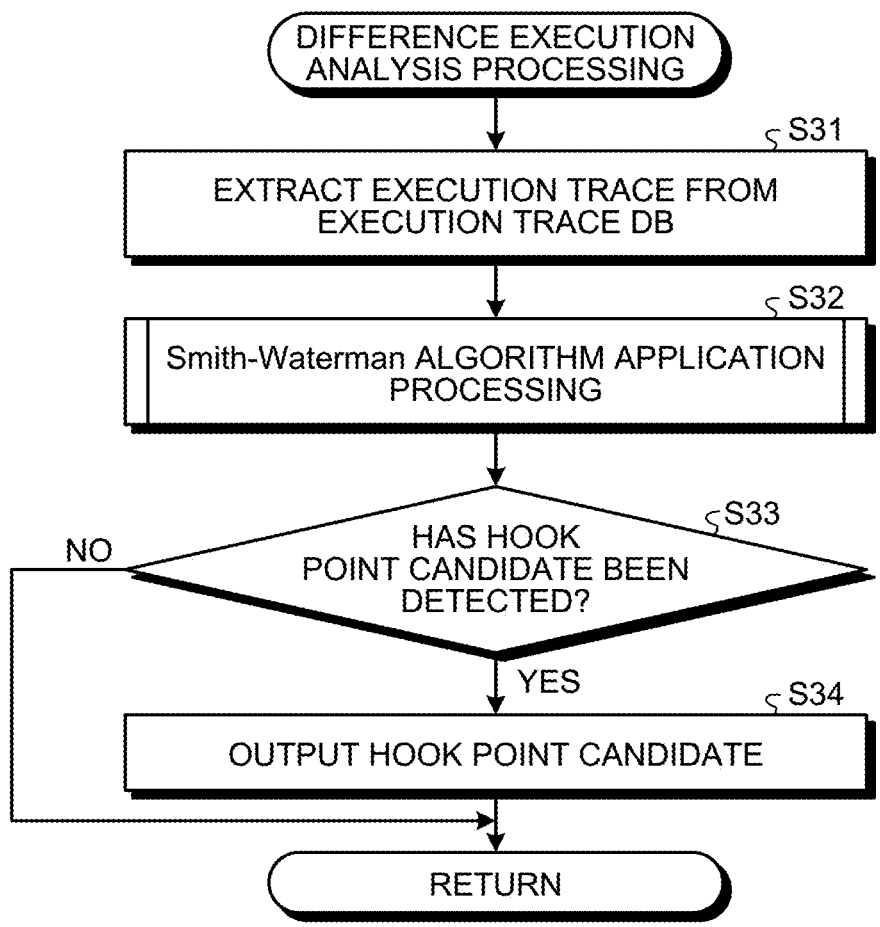
FIG. 14 is a flowchart illustrating a processing procedure of difference execution analysis processing illustrated in FIG. 11.

Next, the flow of the difference execution analysis processing (Step S5) illustrated in FIG. 11 is described. FIG. 14 is a flowchart illustrating a processing procedure of the difference execution analysis processing illustrated in FIG. 11.

First, the difference execution analysis unit 1222 extracts an execution trace from the execution trace DB 21 (Step S31). Then, the difference execution analysis unit 1222 performs Smith-Waterman algorithm application processing (Step S32). By performing the processing, the difference execution analysis unit 1222 extracts differences among a plurality of execution traces under different acquisition conditions to find a part satisfying a particular condition.

When a hook point candidate has been detected (Yes at Step S33), the difference execution analysis unit 1222 outputs the hook point candidate (Step S34). On the other hand, when a hook point candidate has not been detected (No at Step S33), the difference execution analysis unit 1222 finishes the processing.

Figure 15:
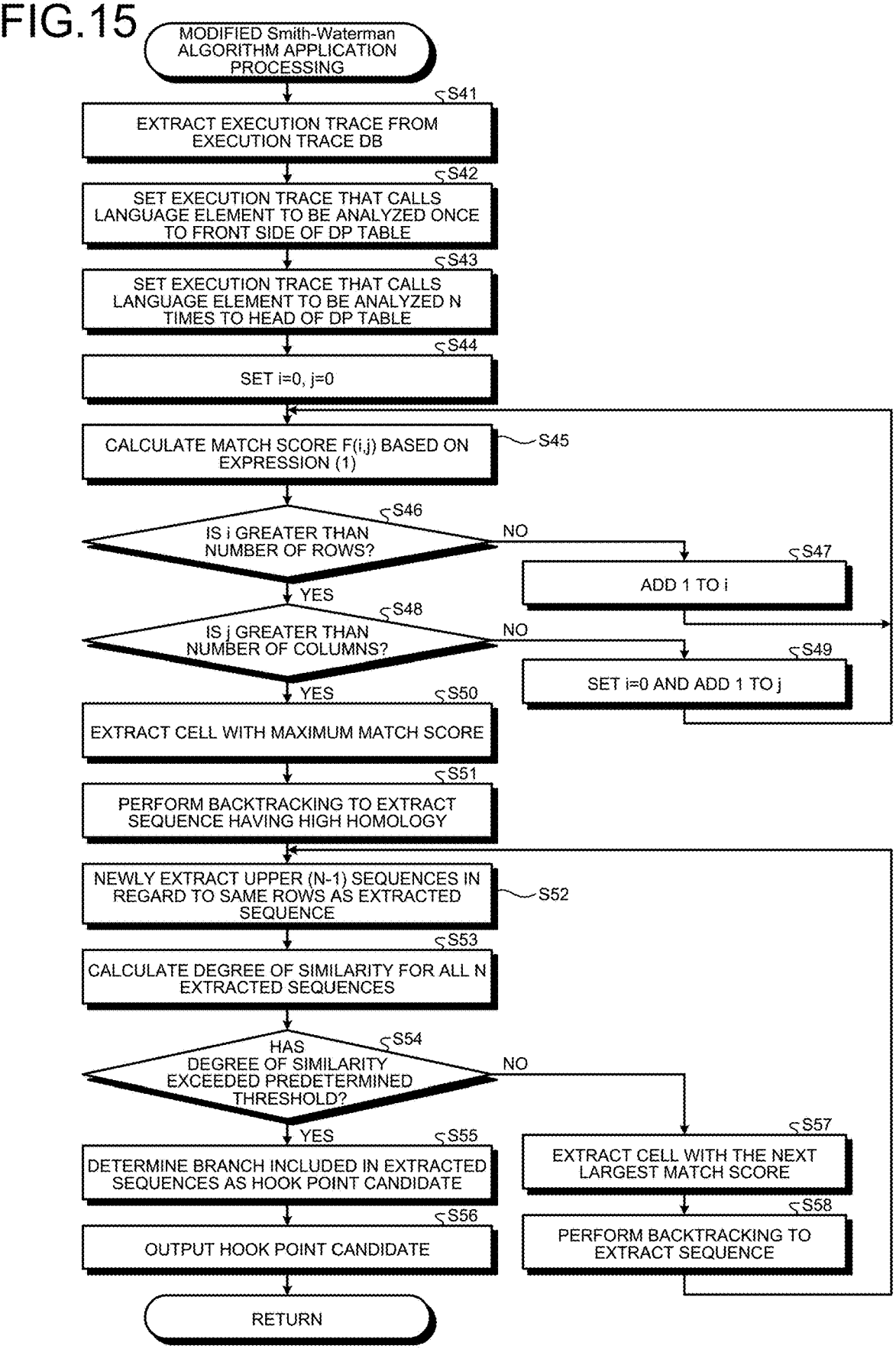
FIG. 15 is a flowchart illustrating a processing procedure of modified Smith-Waterman algorithm application processing illustrated in FIG. 14.

Processing Procedure of Modified Smith-Waterman Algorithm Application Processing Next, the flow of the modified Smith-Waterman algorithm application processing (Step S32) illustrated in FIG. 14 is described. FIG. 15 is a flowchart illustrating a processing procedure of the modified Smith-Waterman algorithm application illustrated in FIG. 14.

First, the difference execution analysis unit 1222 extracts an execution trace from the execution trace DB 21 (Step S41). In this case, the execution trace is an execution trace for differential execution analysis, and hence two types of execution traces are retrieved: an execution trace that calls the language element to be analyzed once and an execution trace that calls it a plurality of times.

The difference execution analysis unit 1222 places the execution trace that calls the language element to be analyzed once on the front side of the DP table (Step S42). The difference execution analysis unit 1222 places the execution trace that is also called a plurality of times at the head of the DP table (Step S43). Then, the difference execution analysis unit 1222 sets i=0, j=0 (Step S44), and calculates the match score F(i,j) based on the Expression (1) (Step S45).

Here, the difference execution analysis unit 1222 determines whether i is greater than the number of rows (Step S46). When the difference execution analysis unit 1222 determines that i is not greater than the number of rows (No at Step S46), the difference execution analysis unit 1222 adds 1 to i (Step S47), and then returns to the calculation of the match score (Step S45) to continue the processing.

On the other hand, if the difference execution analysis unit 1222 determines that i is greater than the number of rows (Yes at Step S46), the difference execution analysis unit 1222 determines whether j is greater than the number of columns (Step S48). When the difference execution analysis unit 1222 determines that j is not greater than the number of columns (No at Step S48), the difference execution analysis unit 1222 sets i=0, adds 1 to j (Step S49), and then returns to the calculation of the match score (Step S45) to continue the processing.

In contrast, if the difference execution analysis unit 1222 determines that j is greater than the number of columns (Yes at Step S48), the difference execution analysis unit 1222 extracts the cell with the largest match score (Step S50) and backtracks from there to extract the sequence with the highest homology (Step S51).

The difference execution analysis unit 1222 newly extracts the upper (N−1) sequence for the same row as the extracted sequence (Step S52). The difference execution analysis unit 1222 calculates the degree of similarity for each of the N extracted sequence in all of the previous N (Step S53). The difference execution analysis unit 1222 determines whether each calculated similarity exceeds a predetermined threshold (Step S54).

If the difference execution analysis unit 1222 determines that the calculated similarities do not exceed the respective predetermined thresholds (Yes at Step S54), the branch included in the extracted sequence is set as a hook point candidate (Step S55), and the processing is terminated by outputting this hook point candidate (Step S56). In contrast, if the difference execution analysis unit 1222 determines that each calculated similarity does not exceed a predetermined threshold (No at Step S54), the difference execution analysis unit 1222 extracts the cell with the next largest match score (Step S57), backtracks and extracts the sequence (Step S58), and returns to Step S52 to continue the processing.

Processing Procedure of Tap Point Detection Processing

Figure 16:
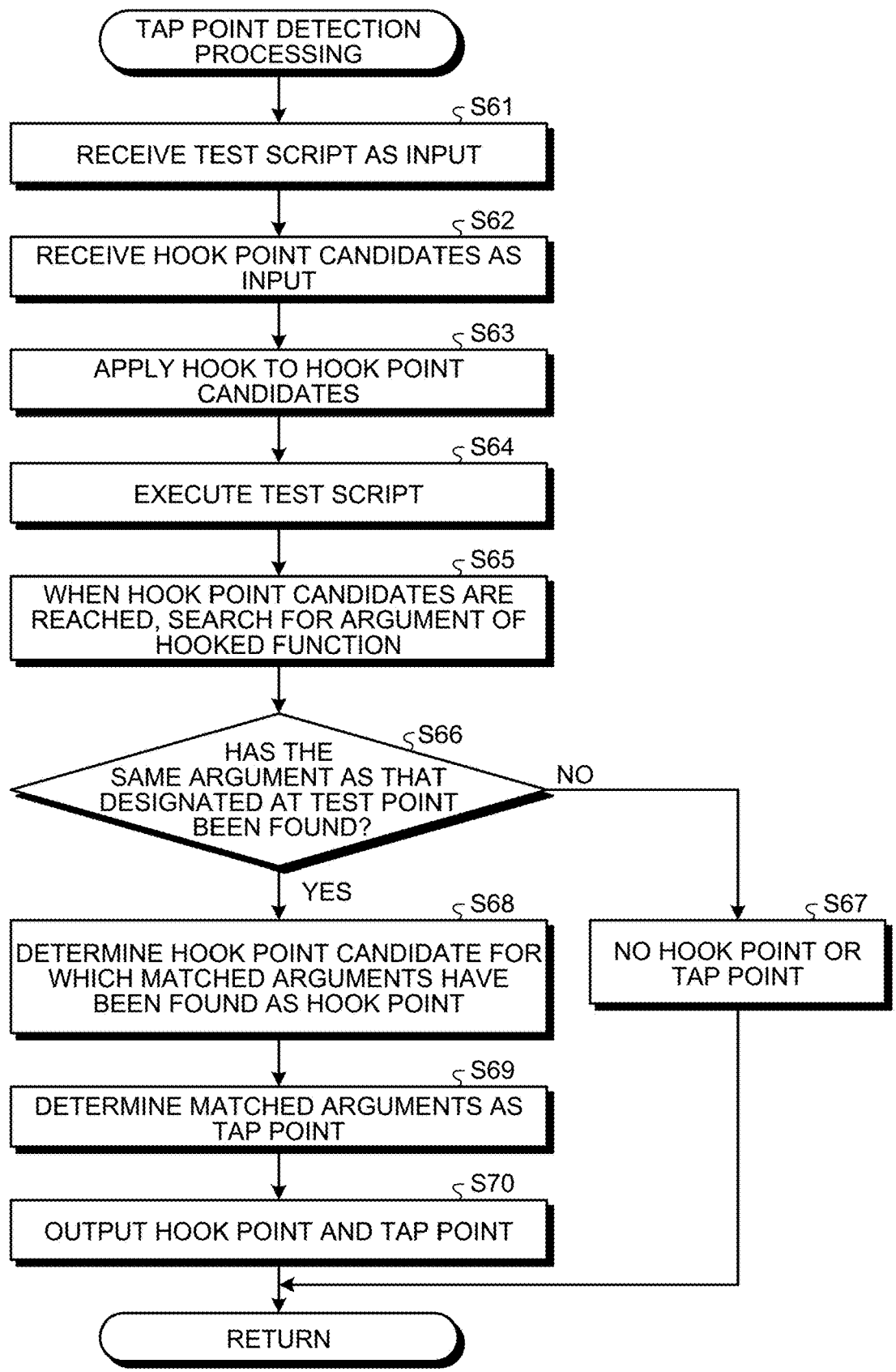
FIG. 16 is a flowchart illustrating a processing procedure of tap point detection processing illustrated in FIG. 11.

Next, the flow of the tap point detection processing (Step S7) illustrated in FIG. 11 is described. FIG. 16 is a flowchart illustrating a processing procedure of the tap point detection processing illustrated in FIG. 11.

First, the tap point detection unit 123 receives a test script and a hook point candidate as input (Steps S61 and S62). The tap point detection unit 123 applies a hook to all locations of the candidate hook point candidates (Step S63) and executes the test script (Step S64). When the tap point detection unit 123 reaches the hook point candidates, the tap point detection unit 123 searches for the arguments of the hooked functions (Step S65). At the time of this search, the tap point detection unit 123 determines whether the same argument as the one specified in the test script is found (Step S66).

If the tap point detection unit 123 determines that the same argument specified in the test script has not been found (No at Step S66), the tap point detection unit 123 assumes that there is no hook point and tap point (Step S67), and finishes the processing.

On the other hand, if the tap point detection unit 123 determines that the same argument as the one specified in the test script was found (Yes at Step S66), the hook point candidate where the matched argument was found is determined as the hook point (Step S68), and the location of the matched argument is set as the tap point (Step S69). Then, the tap point detection unit 123 outputs the hook point and tap point (Step S70), and the processing is finished.

Processing Procedure of Analysis Function Imparting Processing

Figure 17:
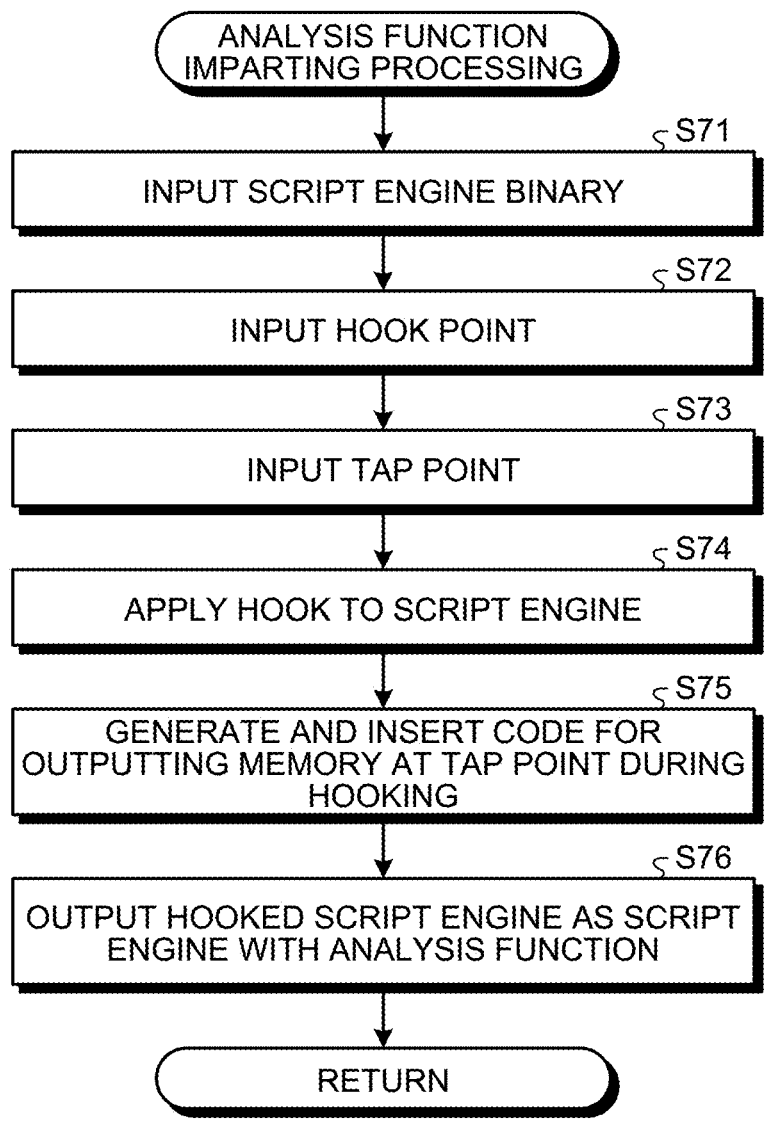
FIG. 17 is a flowchart illustrating a processing procedure of analysis function imparting processing illustrated in FIG. 11.

Next, the flow of the analysis function imparting processing (Step S9) illustrated in FIG. 11 is described. FIG. 17 is a flowchart illustrating a processing procedure of the analysis function imparting processing illustrated in FIG. 11.

First, the analysis function imparting unit 124 receives a script engine binary and the detected hook point and tap point as input (Step S71 to Step S73). The analysis function imparting unit 124 applies a hook to the hook point of the script engine (Step S74), and generates and inserts code so that the code that outputs the memory at the tap point is executed at the time of this hooking (Step S75). The analysis function imparting unit 124 outputs the obtained script engine applied with the hook as a script engine with the analysis function (Step S76), and finishes the processing.

Effects of Embodiment

As described above, the analysis function imparting device 10 according to the present embodiment uses a test script to acquire an execution trace from a script engine to which an analysis function is to be imparted. The analysis function imparting device 10 analyzes the execution trace by backtrace analysis and difference execution analysis to detect hook point candidates. Furthermore, the analysis function imparting device 10 applies a hook to the hook point candidates and executes the hook point candidates to search the memory, thereby determining a hook point and detecting a tap point. Subsequently, the analysis function imparting device 10 applies a hook to the script engine based on the obtained hook point and tap point to impart an analysis function to the script engine.

In this manner, the analysis function imparting device 10 can detect a hook point and a tap point even for proprietary script engines for which only binaries are available, and impart an analysis function without requiring manual reverse engineering.

Because the analysis function imparting device 10 implements script engine level hooking, it is possible to monitor the behavior of the script in the vicinity of the script, making it possible to achieve analysis without semantic gaps.

Unlike script level hooking, the analysis function imparting device 10 applies a hook in a way that does not depend on the language specifications of the scripting language, and hence the analysis function imparting device 10 can impart an analysis function to script engines for a wide variety of scripting languages.

As described above, the analysis function imparting device 10 can analyze a script engine and impart an analysis function retroactively to the script engine, thereby automatically imparting an analysis function without semantic gaps to script engines of a wide variety of scripting languages.

In other words, the analysis function imparting device 10 is useful for analyzing the behavior of malignant scripts written in a wide variety of scripting languages, and is suitable for performing analysis on malignant scripts without being affected by semantic gaps. Therefore, according to the present embodiment, by using the analysis function imparting device 10 to impart an analysis function to various script engines, it is possible to analyze malicious scripts and make use of them for detection and other countermeasures.

Other Embodiments

System Configuration, Etc.

The components of each device illustrated in the figure are functional concepts, and do not necessarily need to be physically configured as illustrated in the figure. In other words, the specific form of dispersion and integration of each device is not limited to the one illustrated in the figure, and all or part thereof can be functionally or physically distributed and integrated in any unit according to various loads and usage conditions. In addition, all or any part of the processing functions performed by each device can be implemented by a CPU and a program that is analyzed and executed by the CPU, or by hardware using wired logic.

In addition, among the processes described in the present embodiment, all or part of the processes described as being performed automatically can be performed manually, or all or part of the processes described as being performed manually can be performed automatically by known methods. In addition, the processing procedures, control procedures, specific names, and information including various data and parameters illustrated in the above documents and drawings can be changed at will, except as otherwise noted.

Computer Program

Figure 18:
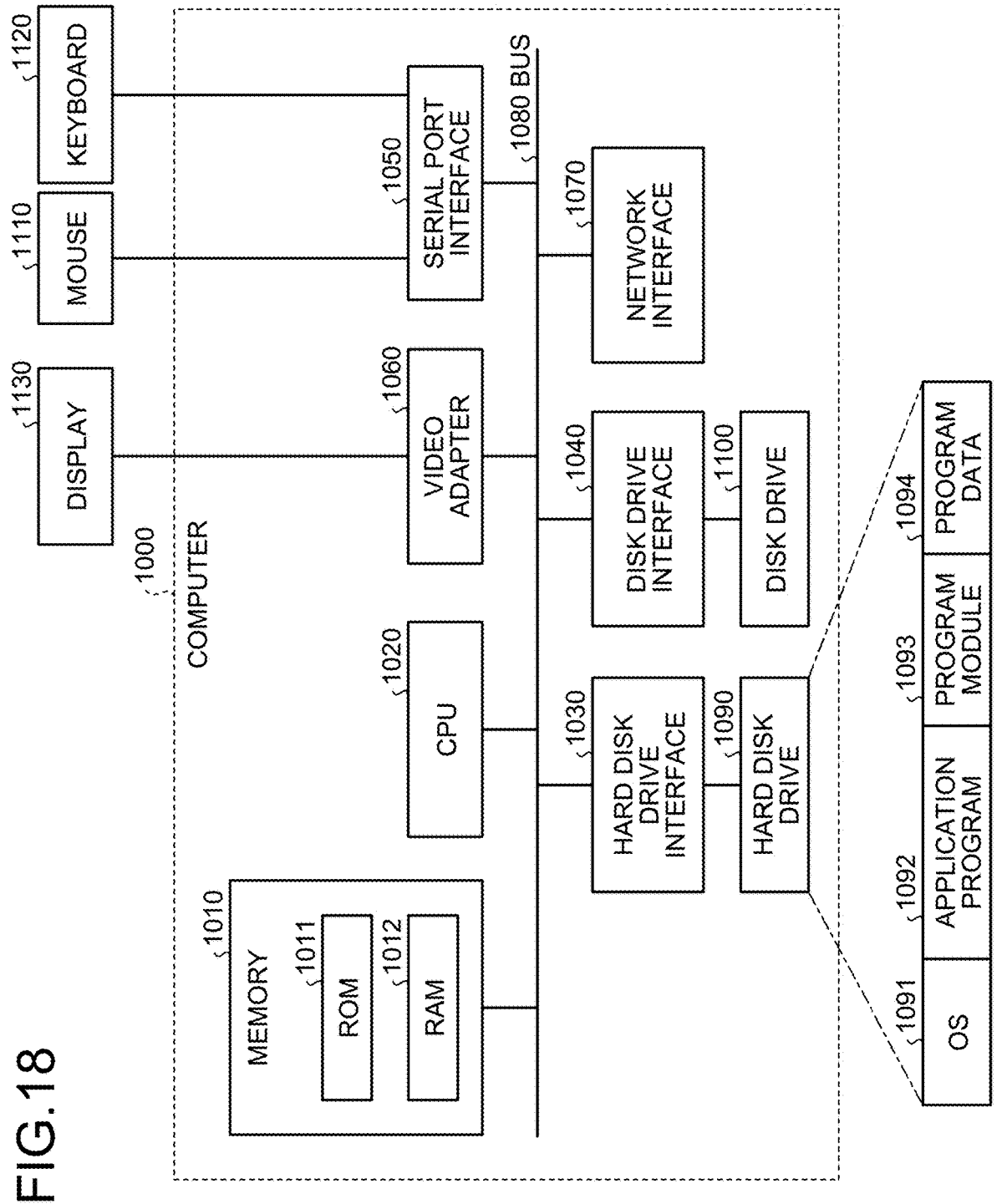
FIG. 18 is a diagram illustrating an example of a computer in which an analysis function imparting device is implemented by executing a computer program.

FIG. 18 is a diagram illustrating an example of a computer in which the analysis function imparting device 10 is implemented when a computer program is executed. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. The units are connected by a bus 1080.

The memory 1010 includes a read only memory (ROM) 1011 and a RAM 1012. For example, the ROM 1011 stores therein a boot program such as a basic input output system (BIOS). The hard disk drive interface 1030 is connected to a hard disk drive 1090. The disk drive interface 1040 is connected to the disk drive 1100. For example, a removable storage medium such as a magnetic disk and an optical disc is inserted to the disk drive 1100. The serial port interface 1050 is connected to, for example, a mouse 1110 and a keyboard 1120. The video adapter 1060 is connected to, for example, a display 1130.

For example, the hard disk drive 1090 stores therein an OS 1091, an application program 1092, a program module 1093, and program data 1094. In other words, a computer program that defines each piece of processing in the analysis function imparting device 10 is mounted as the program module 1093 in which codes that can be executed by the computer 1000 are written. For example, the program module 1093 is stored in the hard disk drive 1090. For example, the program module 1093 configured to execute the same processing as the functional configuration in the analysis function imparting device 10 is stored in the hard disk drive 1090. Note that the hard disk drive 1090 may be substituted with a solid state drive (SSD).

Data used for the processing in the above-mentioned embodiment is stored in, for example, the memory 1010 and the hard disk drive 1090 as the program data 1094. The CPU 1020 reads the program module 1093 and the program data 1094 stored in the memory 1010 and the hard disk drive 1090 onto the RAM 1012 and executes the program module 1093 and the program data 1094 as necessary.

Note that the program module 1093 and the program data 1094 are not necessarily requested to be stored in the hard disk drive 1090, and, for example, may be stored in a removable storage medium and read by the CPU 1020 through the disk drive 1100. Alternatively, the program module 1093 and the program data 1094 may be stored in another computer connected through a network (such as LAN and WAN). The program module 1093 and the program data 1094 may be read by the CPU 1020 from another computer through the network interface 1070.

While the embodiment applying the invention made by the inventor has been described, the present invention is not limited by the description and drawings that form part of the disclosure of the present invention by the present embodiment. In other words, all other embodiments, examples, and operational techniques, etc., made by those skilled in the art, etc., based on the present embodiment are included in the scope of the invention.

REFERENCE SIGNS LIST

10 analysis function imparting device
11 input unit
12 control unit
13 output unit
14 storage unit
21 execution trace DB
22 hook point DB
23 tap point DB
121 execution trace acquisition unit
122 hook point detection unit
123 tap point detection unit
124 analysis function imparting unit
1221 backtrace analysis unit
1222 difference execution analysis unit

The invention claimed is:

1. An analysis function imparting device comprising:
processing circuitry configured to:
execute a script on a script engine of an operating system or an application running on the operating system while monitoring the script engine to acquire an execution trace including an application programming interface (API) trace and a branch trace;
analyze the execution trace, and detect a hook point that is a location to which a hook is applied and a code for analysis is inserted;
detect, based on monitoring at the hook point, a tap point that is a memory monitoring location at which the code for analysis outputs a log; and
apply the hook to the script engine to impart an analysis function to the script engine based on the hook point and the tap point.

2. The analysis function imparting device according to claim 1, wherein the processing circuitry is further configured to detect the hook point based on a difference found between execution traces with different conditions.

3. The analysis function imparting device according to claim 2, wherein the processing circuitry is further configured to detect the hook point by using an algorithm for detecting that sequences having high homology appear a particular number of times.

4. The analysis function imparting device according to claim 3, wherein the processing circuitry is further configured to use a modified Smith-Waterman algorithm as the algorithm for detecting that sequences having high homology appear the particular number of times.

5. The analysis function imparting device according to claim 1, wherein the processing circuitry is further configured to detect the hook point by applying backtrace from a system API corresponding to a language element to be analyzed.

6. The analysis function imparting device according to claim 1, wherein the processing circuitry is further configured to determine a hook point candidate having the tap point as a hook point.

7. The analysis function imparting device according to claim 1, wherein the script is a test script.

8. The analysis function imparting device according to claim 7, wherein the test script includes script language elements to be analyzed.

9. The analysis function imparting device according to claim 8, wherein the test script only includes the language elements to be analyzed.

10. The analysis function imparting device according to claim 8, wherein the test script further includes arguments for the language elements to be analyzed.

11. An analysis function imparting method comprising:
executing a script on a script engine of an operating system or an application running on the operating system while monitoring the script engine to acquire an execution trace including an application programming interface (API) trace and a branch trace;
analyzing the execution trace; and detecting a hook point that is a location to which a hook is applied and a code for analysis is inserted;
detecting, based on monitoring at the hook point, a tap point that is a memory monitoring location at which the code for analysis outputs a log; and
applying the hook to the script engine to impart an analysis function to the script engine based on the hook point and the tap point, by processing circuitry.

12. The analysis function imparting method according to claim 11, wherein the script is a test script.

13. The analysis function imparting method according to claim 12, wherein the test script includes script language elements to be analyzed.

14. The analysis function imparting method according to claim 13, wherein the test script only includes the language elements to be analyzed.

15. The analysis function imparting method according to claim 13, wherein the test script further includes arguments for the language elements to be analyzed.

16. A non-transitory computer-readable recording medium storing therein an analysis function imparting program that causes a computer to execute a process comprising:
executing a script on a script engine of an operating system or an application running on the operating system while monitoring the script engine to acquire an execution trace including an application programming interface (API) trace and a branch trace;
analyzing the execution trace, and detecting a hook point that is a location to which a hook is applied and a code for analysis is inserted;
detecting, based on monitoring at the hook point, a tap point that is a memory monitoring location at which the code for analysis outputs a log; and
applying the hook to the script engine to impart an analysis function to the script engine based on the hook point and the tap point.

17. The non-transitory computer-readable recording medium claim 16, wherein the script is a test script.

18. The non-transitory computer-readable recording medium claim 17, wherein the test script includes script language elements to be analyzed.

19. The non-transitory computer-readable recording medium claim 18, wherein the test script only includes the language elements to be analyzed.

20. The non-transitory computer-readable recording medium claim 18, wherein the test script further includes arguments for the language elements to be analyzed.

* * * * *